United States Patent
Parr-Burman et al.

[11] Patent Number: 5,731,918
[45] Date of Patent: Mar. 24, 1998

[54] LENS MOUNTING FOR OPTICAL INSTRUMENT

[75] Inventors: Philip Michael Parr-Burman, Abergele; Graham Evans, Huntington; Allan Gardam, Rhuddlan, all of United Kingdom

[73] Assignee: Pilkington P.E. Limited, Clwyd, Wales

[21] Appl. No.: 693,176

[22] PCT Filed: Feb. 16, 1995

[86] PCT No.: PCT/GB95/00325

§ 371 Date: Sep. 12, 1996

§ 102(e) Date: Sep. 12, 1996

[87] PCT Pub. No.: WO95/22778

PCT Pub. Date: Aug. 24, 1995

[30] Foreign Application Priority Data

Feb. 19, 1994 [GB] United Kingdom ............... 9403200

[51] Int. Cl.$^6$ .................. G02B 7/02; G02B 15/14
[52] U.S. Cl. .................. 359/823; 359/822; 359/696
[58] Field of Search ................. 359/821, 822, 359/823, 824, 696, 813, 814

[56] References Cited

U.S. PATENT DOCUMENTS

| | | | |
|---|---|---|---|
| 2,668,476 | 2/1954 | Isom | 88/57 |
| 5,016,993 | 5/1991 | Akitake | 359/969 |
| 5,150,260 | 9/1992 | Chigira | 359/694 |
| 5,166,829 | 11/1992 | Iizuka | 359/699 |
| 5,177,628 | 1/1993 | Emura et al. | 359/704 |
| 5,225,941 | 7/1993 | Saito et al. | 359/824 |
| 5,345,290 | 9/1994 | Watanabe et al. | 354/400 |
| 5,391,866 | 2/1995 | Hoshimo et al. | 250/201.2 |
| 5,497,272 | 3/1996 | Wun | 359/821 |
| 5,552,939 | 9/1996 | Tseng et al. | 359/821 |

FOREIGN PATENT DOCUMENTS

| | | |
|---|---|---|
| 0 182 557 | 5/1986 | European Pat. Off. |
| 93/06514 | 4/1993 | WIPO |

OTHER PUBLICATIONS

Japanese Abstract 59 094 708, 31 May 1984, Toukiyou Kougaku Kikai, "Zoom Lens Moving Device".

*Primary Examiner*—David C. Nelms
*Assistant Examiner*—Ricky Mack
*Attorney, Agent, or Firm*—Bell Seltzer; Intellectual Property Law Group of Alston & Bird LLP

[57] ABSTRACT

The invention relates to a lens mounting suitable for use in a high performance optical instrument. The mounting (10) comprises a body or housing, a linear guide (16; 18; 36; 46; 64) mounted on the body, a lens carriage (14; 34; 44; 62) moveable along the linear guide, and a linear drive, which may be in the form of a ball-screw drive and comprising a ball-screw (20; 80) extending substantially parallel to the linear guide and a ball-screw follower (22; 68) linked to the lens carriage such that rotation of the ball-screw moves the carriage axially along the guide. One or more elements of the ball-screw drive are mounted relative to the linear guide to permit a degree of relative movement therebetween to accomodate misalignment between the linear guide and ball-screw.

7 Claims, 3 Drawing Sheets

1

LENS MOUNTING FOR OPTICAL INSTRUMENT

FIELD OF THE INVENTION

This invention relates to a lens mounting for a high performance optical instrument.

BACKGROUND OF THE INVENTION

High performance optics often imply very tight tolerances for positioning lenses both axially and radially. To satisfy such tolerances lens carriages are often mounted on rolling element linear guides, and ball-screws provided for axially locating the lens carriages. The precision required in high performance optical instruments including such components gives rise to tight mechanical alignment requirements; errors in alignment of just a few microns can cause increases in friction sufficient to seize the mechanism.

Various methods are utilised to address this problem, generally utilising some means of careful alignment of the guides and ball-screw followed by fixation. Providing such accurate alignment adds considerably to the costs of the mechanism, and also the mechanism remains sensitive to small deformations in its structure, for example due to thermally induced stresses.

It is among the objects of the present invention to obviate and mitigate these disadvantages.

SUMMARY OF THE INVENTION

According to the present invention there is provided a lens mounting for a high performance optical instrument, the mounting comprising:

a body;

a linear guide mounted on the body;

a lens carriage moveable along the linear guide; and a linear drive mounted on the body with a drive member extending substantially parallel to the linear guide, and a drive member follower being linked to the lens carriage such that actuation of the drive member or drive member follower moves the carriage axially along the guide, one or more elements of the linear drive being mounted relative to the linear guide to permit a degree of relative movement therebetween to accommodate misalignment between the linear guide and the drive member.

Preferably, the linear drive is in the form of a ball-screw drive comprising a ball-screw extending substantially parallel to the linear guide and a ball-screw follower linked to the lens carriage such that rotation of the ball-screw moves the carriage axially along the guide.

Preferably also, the coupling between the ball-screw drive and the linear guide substantially precludes said relative movement in the axial direction to ensure accurate axial location of the lens carriage by the ball-screw drive.

The ball-screw may be mounted relative the body to accommodate a degree of relative movement therebetween, and thus between the ball-screw and the linear guide; one or more of the bearings supporting the ball-screw may be mounted to the body to permit such movement, for example by mounting an end bearing in an elastomeric compound. This arrangement allows provision of a substantially rigid coupling between the ball-screw follower and the lens carriage. Alternatively, a coupling may be provided between the ball-screw follower and the lens carriage that allows for a limited degree of relative movement therebetween; such a coupling may be in the form of a flexure, a spherical/bearing or an elastomeric element.

2

BRIEF DESCRIPTION OF THE DRAWINGS

This and other aspects of the present invention will now be described, by way of example, with reference to the accompanying drawings, in which.

DETAILED DESCRIPTION OF PREFERRED EMBODIMENTS

Figure 1:
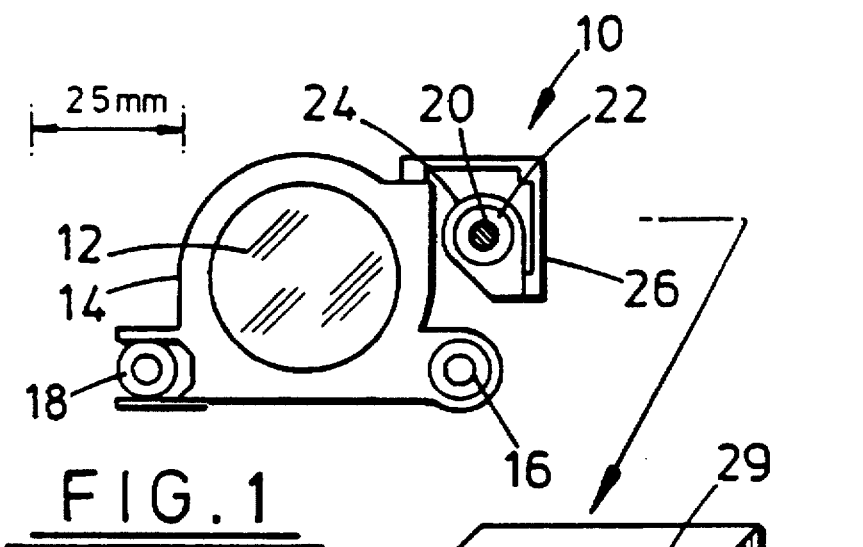
FIG. 1 is an end view of a lens mounting in accordance with a first embodiment of the present invention.
Figure 2:
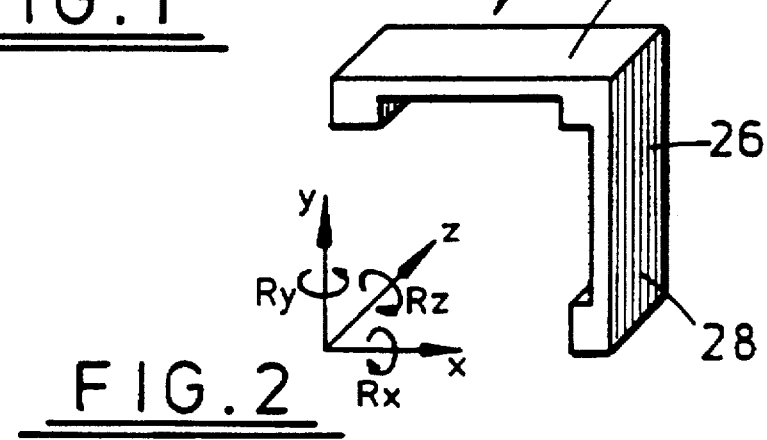
FIG. 2 is a perspective view from above of a flexure of the mounting of FIG. 1.

Reference is first made to FIGS. 1 and 2 of the drawings which illustrate, somewhat schematically, a lens mounting 10 in accordance with a first embodiment of the present invention. The lens mounting 10 is itself mounted on a body or within a housing (not shown). The illustrated arrangement is typical of an application in which relatively small displacements of a lens are required, such as for focus mechanisms. A lens 12 is mounted in a carriage 14 itself mounted on two linear guides 16, 18 in the form of cylindrical rods. One of the rods 16 provides a reference, while the other rod 18 is utilised to prevent rotation.

A ball-screw 20 extends parallel to the guides 16, 18, and a ball-screw follower or nut 22 is rotatably mounted within a housing 24. An angled flexure 26 of a flexible but stiff material connects the housing 24 to the lens carriage 14 such that rotation of the ball-screw 20, resulting in the nut 22 travelling along the ball-screw, moves the lens carriage 14 axially along the guides 16, 18.

The flexure 26 comprises a pair of thin planar members 28, 29 at a right angle to one another and arranged to lie in planes perpendicular to the guides 16, 18 and ball-screw 20. Thus, the flexure 26 is relatively rigid in the axial or Z-direction, to ensure accurate axial location of the lens carriage 14 but will accommodate bending in other planes and will also accommodate bending as a result of torsion. Accordingly, any minor misalignment between the ball-screw 20 and the guides 16, 18 may be accommodated by bending of the flexure 26.

Figure 3:
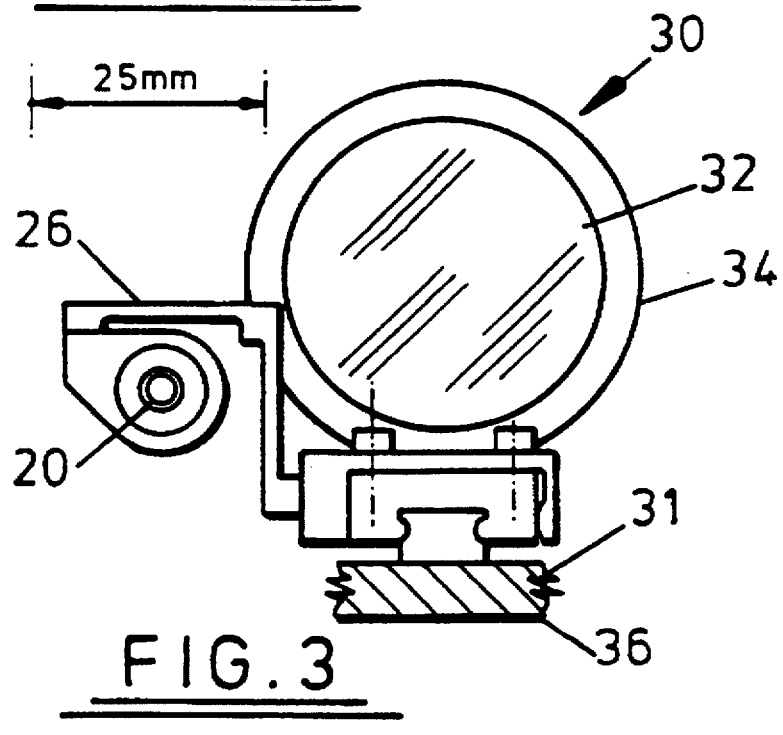
FIG. 3 is an end view of a lens mounting in accordance with a second embodiment of the present invention.

For larger lens displacements, such as required in zoom telescopes, the relatively low stiffness of rods, and the inability to support them along their length, becomes a problem. Thus, where larger displacements are required the arrangement as illustrated in FIG. 3 of the drawings may be utilised. In this lens mounting 30, in accordance with a second embodiment of the present invention, the lens 32 and the lens carriage 34 are mounted on a linear rail 36, which may be supported along its length by a part of the lens body 31.

The ball-screw 20 and flexure 26 are similar to those described in the first embodiment.

Figure 4:
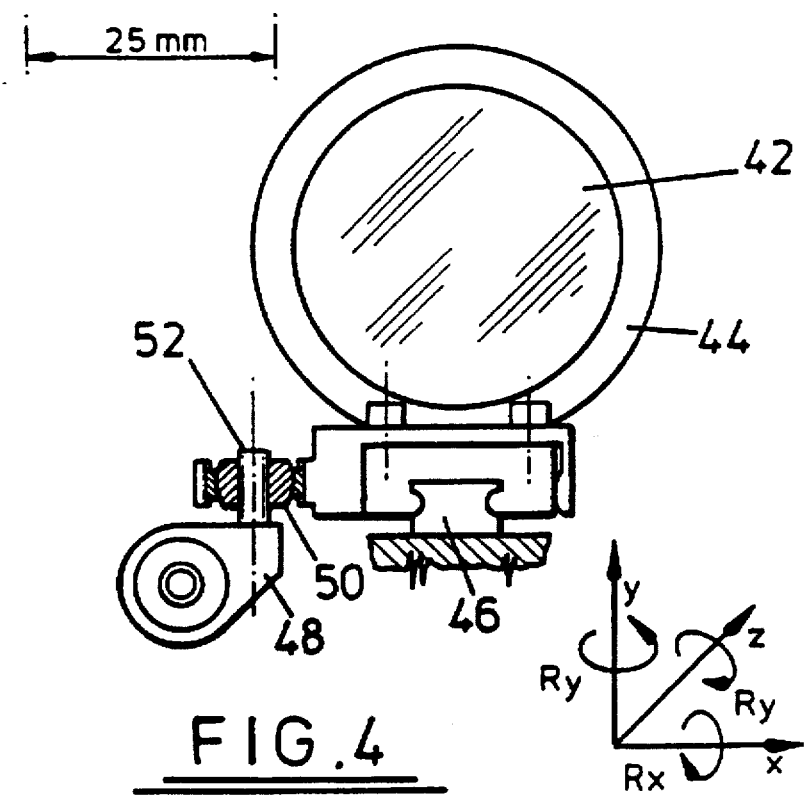
FIG. 4 is an end view of a lens mounting in accordance with a third embodiment of the present invention.

Reference is now made to FIG. 4 of the drawings, which, like the embodiment illustrated in FIG. 3, provides a lens 42 mounted in a lens carriage 44 movable along a linear rail 46. However, the linkage between the ball-screw nut housing 48 and the carriage 44 is in the form of a spherical (rose)

bearing 50. In addition, the pin 52 extending from the housing 48 to engage the bearing 50 is slidable in the bearing.

This embodiment offers the advantage that the stresses induced in the mounting 40 between the linear rail and ball-screw are very low, being due only to friction in the bearing. However, due to the necessary clearances in the bearing 50, which may introduce backlash, the positioning accuracy of the mounting 40 may be lower than the first and second embodiments described above.

Figure 5:
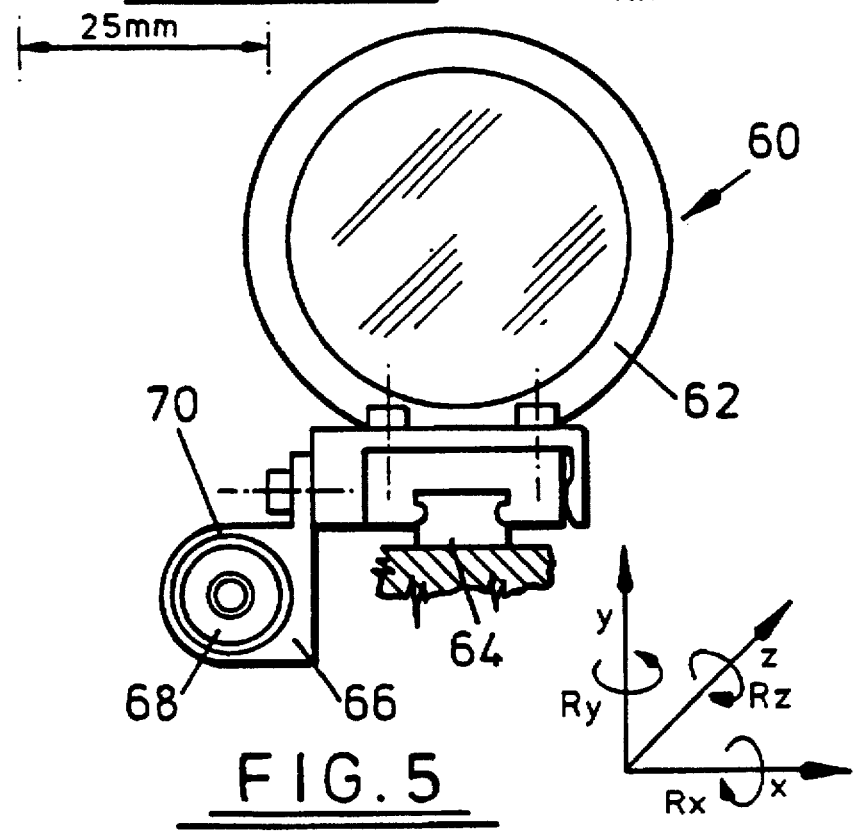
FIG. 5 is an end view of a lens mounting in accordance with a fourth embodiment of the present invention.

Reference is now made to FIG. 5 of the drawings which illustrates a fourth embodiment of the present invention. Again, the mounting 60 comprises a lens carriage 62 mounted on a linear rail 64. In this particular embodiment the housing 66 for the ball-screw nut 68 is mounted directly to the lens carriage 62. However, the nut 68 is "potted" within the housing 66, that is provided with an elastomeric mounting 70. This arrangement relies on the fact that the forces tending to deviate the nut 68 are larger than those needed to drive the linear carriage 62; the mounting 70 will only be subject to deformation when there is misalignment of the ball-screw and rail 64, but will not deform during normal usage.

Figure 6:
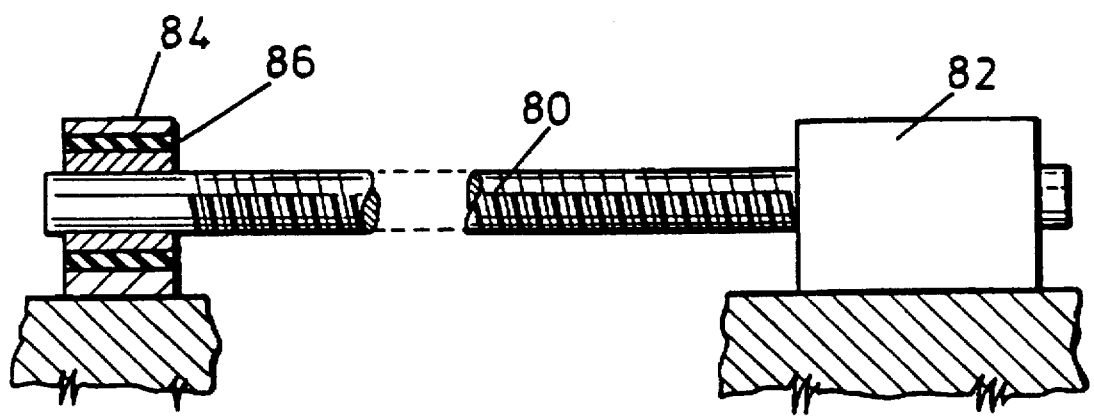
FIG. 6 is a side view of parts of a lens mounting in accordance with a fifth embodiment of the present invention.

Reference is now made to FIG. 6 of the drawings which illustrates a ball-screw 80 in accordance with a fifth embodiment of the invention and which offers a somewhat different solution from the embodiments described above: rather than providing a flexible linkage between the ball-screw nut housing and the lens carriage it is possible to mount the ball-screw 80 in such a manner that misalignment between the ball-screw 80 and linear guide (not shown) will be accommodated by movement of the ball-screw itself, as described below.

A ball-screw 80 is generally mounted on rotary bearings 82, 84. One end of the ball-screw may be provided with a duplex bearing 82 to provide good axial stiffness, while the other end has a simple locating radial bearing 84. If this radial bearing 84 is mounted in an elastomeric compound 86 a small amount of flexibility is provided which permits the mechanism to continue to move in the event of misalignment. Although this method does not obviate in requirement for initial accurate alignment, it does allow some flexibility to account for thermally induced deformation.

It will be apparent to those of skill in the art that the above-described embodiments provide relatively simple means for avoiding difficulties associated with the tight mechanical requirements alignment of ball-screws and linear guides in high performance optical instruments. It will also be apparent to those of skill in the art that the above-described embodiments are merely exemplary of the present invention and that various modifications and improvements may be made thereto, without departing from the scope of the invention.

We claim:

1. A lens mounting for a high performance optical instrument, the mounting comprising:

a body;

a linear guide mounted on the body;

a lens carriage moveable along the linear guide;

a ball screw drive mounted on the body and including a ball screw extending substantially parallel to the linear guide; and a ball screw follower linked to the lens carriage such that rotation of the ball screw moves the carriage axially along the guide, the ball screw follower and the lens carriage being coupled to preclude relative movement therebetween in an axial direction, to ensure accurate axial location of the lens carriage by the ball-screw drive, and the ball-screw being supported on bearings and at least one of the bearings being mounted to the body to permit a degree of relative movement therebetween, to accommodate misalignment between the linear guide and the ball screw.

2. The mounting of claim 1 wherein said at least one of the bearings supporting the ball-screw are mounted in an elastomeric material.

3. A lens mounting for a high performance optical instrument, the mounting comprising:

a body a linear guide mounted on the body;

a lens carriage moveable along the linear guide;

a ball screw drive mounted on the body and including a ball screw extending substantially parallel to the linear guide and a ball screw follower linked to the lens carriage such that rotation of the ball screw moves the carriage axially along the guide; and a flexure between the ball-screw follower and the lens carriage, said flexure comprising a pair of planar members at an angle to one another and lying in planes perpendicular to the linear guide and ball screw, said flexure precluding relative axial movement between the ball-screw follower and the lens carriage, to ensure accurate axial location of the lens carriage by the ball-screw drive, and said flexure allowing a limited degree of bendable relative movement between the ball-screw follower and the lens carriage to accommodate misalignment between the linear guide and the ball screw.

4. A lens mounting for a high performance optical instrument, the mounting comprising:

a body;

a linear guide mounted on the body;

a lens carriage moveable along the linear guide;

a ball screw drive mounted on the body and including a ball screw extending substantially parallel to the linear guide and a ball screw follower linked to the lens carriage such that rotation of the ball screw moves the carriage axially along the guide; and a spherical bearing coupling the ball-screw follower and the lens carriage, said bearing precluding relative axial movement between the ball-screw follower and the lens carriage, to ensure accurate axial location of the lens carriage by the ball-screw drive, and said bearing allowing a limited degree to relative movement between the ball-screw follower and the lens carriage to accommodate misalignment between the linear guide and the ball screw.

5. The mounting of claim 4 wherein said spherical bearing includes a pin extending from the ball-screw follower and which pin is slidable in the bearing.

6. A lens mounting for a high performance optical instrument, the mounting comprising:

a body;

a linear guide mounted on the body;

a lens carriage moveable along the linear guide;

a ball screw drive mounted on the body and including a ball-screw extending substantially parallel to the linear guide and a ball-screw follower linked to the lens carriage such that rotation of the ball-screw moves the carriage axially along the guide; and a flexible coupling comprising an elastomeric element between the ball-screw follower and the lens carriage, said coupling precluding relative axial movement between the ball-screw follower and the lens carriage, to ensure accurate axial location of the lens carriage by the ball-screw drive, and said coupling allowing a limited degree of relative movement between the ball-screw follower and the lens carriage to accommodate misalignment between the linear guide and the ball-screw.

7. The mounting of claim 6 wherein the ball-screw follower is potted in an elastomeric material.

* * * * *